United States Patent Office 3,124,807
Patented Mar. 17, 1964

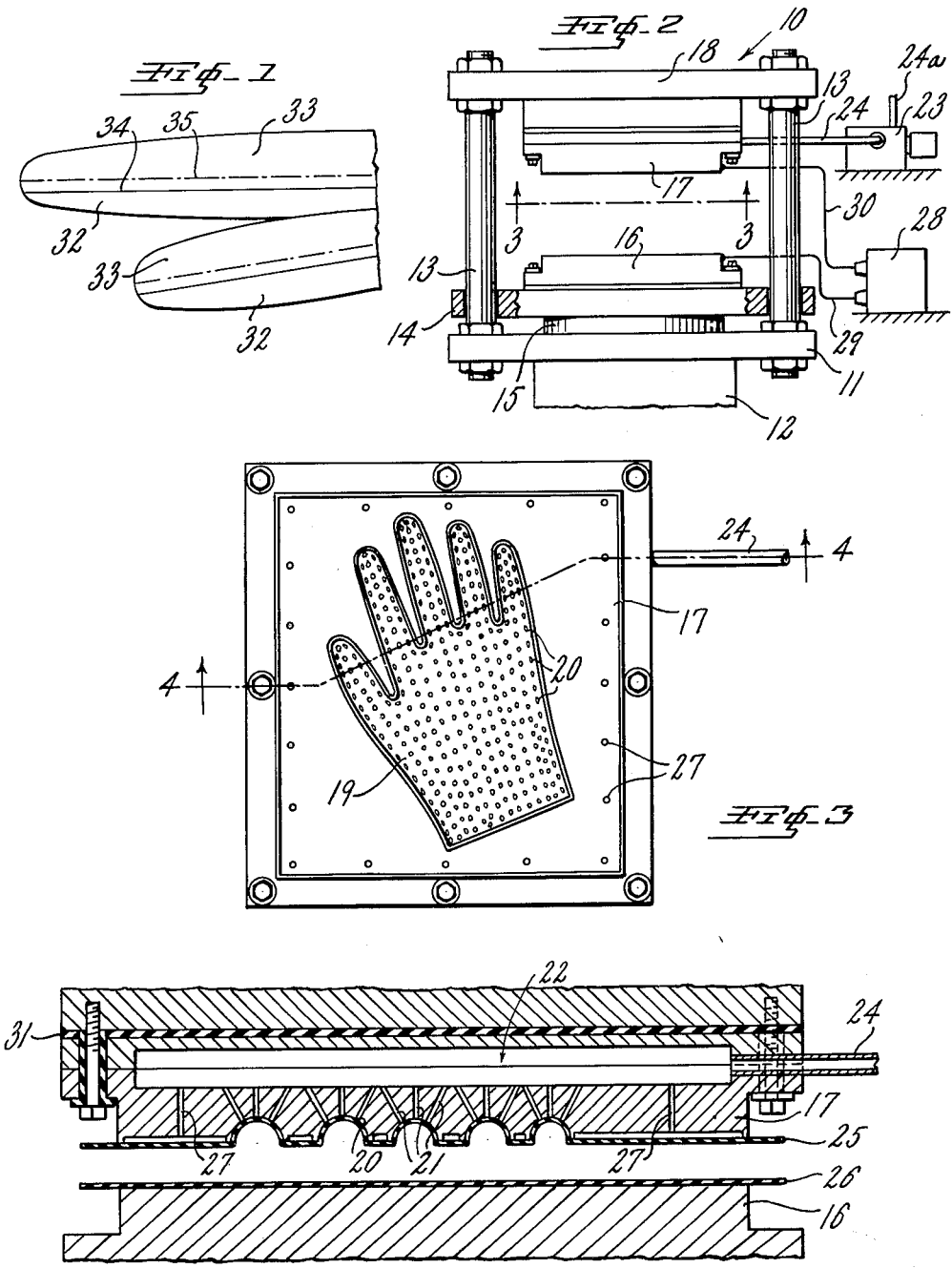

3,124,807
METHOD OF MAKING THREE-DIMENSIONAL
HAND COVERINGS
Marvin A. Frenkel, Huntington Woods, and Claude H. Haney, Dearborn, Mich., assignors to Advance Glove Manufacturing Company, Detroit, Mich., a corporation of Michigan
Filed Jan. 19, 1962, Ser. No. 167,370
2 Claims. (Cl. 2—169)

This invention relates to improved methods of and apparatus for making three-dimensional wearing apparel. More particularly, it relates to the use of improved vacuum forming techniques in the manufacture of hand coverings made from thermoplastic materials having dielectrically sealed seams between the palm and back portions thereof. It is to be understood that "thermoplastic materials" includes thermoplastic film, thermoplastic coated fabric, and fabric comprised of a mixture of thermoplastic and non-thermoplastic yarns.

The present invention relates to improvements upon the invention described and claimed in our copending application Serial No. 76,575, filed December 19, 1960.

The invention described and claimed in our copending application has as one of its objects the provision of a three-dimensional thermoplastic material hand covering having its back and palm portions dielectrically sealed in an area transversely displaced from the central plane between said portions. This is done in order to have those portions of the seams that are located in the finger or thumb crotches positioned away from the points of maximum stress in the crotches.

The foregoing object is accomplished in said copending application by placing a substantially non-conductive, multi-part, assembled form whose upper surface has the spatial contour of a human hand on a layer of flexible thermoplastic material, stretching a second layer of said material over the form so that the form is disposed between the layers in a manner which allows the layers to make intimate contact with each other in the area adjacent to and extending outwardly from the vertical edges of the form, joining the layers together along the vertical edge of the form by dielectric heating means, withdrawing the form by disassembling portions thereof within the sealed layers, trimming off the excess material, and turning the inner surfaces of the hand covering outwardly to produce the three-dimensional hand covering.

While satisfactory three-dimensional hand coverings may be made by the foregoing method, manufacturing delays and increased production costs result due to the necessity of manually assembling and disassembling the form used therein. These delays and costs may be materially reduced, in accordance with this invention, by employing vacuum forming techniques in place of the multi-part form of our copending application. Moreover, the resultant three-dimensional hand covering is improved over the earlier hand covering in that there is less stretching of the thermoplastic material when vacuum forming techniques are employed than has been the case heretofore.

Accordingly, one object of this invention is to provide an improved method of and apparatus for making three-dimensional hand coverings.

A further object of this invention is to provide an improved method and apparatus, employing vacuum forming techniques, for making three-dimensional hand coverings, the improved method and apparatus affording considerable savings in time and manufacturing costs.

Another object of this invention is to provide an improved three-dimensional hand covering having its back and palm portions dielectrically sealed in an area transversely displaced from the central plane between said portions, the material of the hand covering having been subjected to less deleterious stretching during forming than heretofore found necessary.

Further objects and advantages of this invention will become apparent as the following description proceeds.

These and other objects are accomplished by placing a first sheet of flexible thermoplastic material over the surface of a die which has recessed therein the contour of a human hand, evacuating the air from said recessed portion to draw a portion of said first sheet into said recessed portion to thereby impart the contour of said recessed portion to said portion of said first sheet, placing a second sheet of thermoplastic material adjacent said first sheet, heat sealing the sheets around the periphery of said recessed portion, trimming any excess material from said sheets and turning the inner surfaces outwardly to produce the three-dimensional hand coverings.

For a better understanding of the nature of this invention, reference should be had to the following description when read in conjunction with the accompanying drawing, wherein:

FIG. 1 is a fragmentary side view of a thumb and finger slot portion of the hand covering;

FIG. 2 is a front elevational view of the press assembly, vacuum pump, and high frequency generator used in the heat sealing step;

FIG. 3 is a bottom plan view of the top die showing the recessed portion having the contour of a human hand and the conduit openings for evacuating air therefrom; and FIG. 4 is a cross-sectional view of the die structure taken along the line 4—4 of FIG. 3.

A preferred embodiment of the apparatus utilized in this invention is shown generally at 10 in FIG. 2. Lower support member 11 is secured to frame 12 and columns 13 are supported thereby in an upwardly extending vertical position. Plate 14 is mounted for sliding movement on columns 13 and is given a vertical reciprocable movement by ram 15. Secured to plate 14 is lower platen 16 which is essentially a smooth, flat, plate electrode. An upper plate electrode is in the form of a die 17 which is removably attached to upper support 18 carried by the upper extremities of columns 13.

The external surface of die 17, as best illustrated in FIG. 3, has, recessed therein, the contour of a human hand, shown at 19. Within the recessed portion 19, we have provided a plurality of small openings 20 which permit air to pass from the recess, through the conduits 21, and into a vacuum cavity 22, as shown in FIG. 4. To bring about this passage of air a vacuum pump 23 is connected through vacuum line 24 to the vacuum cavity 22. Any conventional vacuum pump may be used for this operation.

In the operation of the device, a layer of flexible thermoplastic material 25 (which material may be thermoplastic film, thermoplastic coated fabric, or fabric having thermoplastic yarn repetitively spaced therein in both directions or combinations of these materials) is held by the operator over the surface of die 17. When the material is in place the vacuum pump 23 is actuated and air is evacuated from recess 19, through conduits 21, vacuum cavity 22, and vacuum line 24, thereby creating a vacuum in recess 19. Because of the flexibility of layer 25 the material is drawn into the recess and assumes the contour thereof. The ability of the material to be drawn into recess 19 provides a distinct advantage over our method previously disclosed in copending application No. 76,575, filed December 19, 1960, in which it was necessary to stretch the material over a form and thereby cause a flow of material outwardly from the central portion of the form. Here there is no flow of material since the outer portions of the material are free to move inwardly and assume the contour of said recess and thereby create a stronger, more durable, product. Additional vacuum conduits 27 have been provided around the periphery of die 17 to support the edges of material 25 so that no interference will develop during subsequent operations.

Various structural changes may be made in the device without departing from the scope of the invention. For example, the vacuum conduits 27 could be completely eliminated if the press structure were reversed to place the contoured die 17 facing upwardly. This would do away with the need of supporting the edges of the material since they would naturally lie flat on the surface of the die.

Following the vacuum forming of the upper layer of material 25, a second layer of said material 26 is placed on the lower platen 16 and the ram 15 is actuated to bring the layers of material 25 and 26 together. As can be seen from FIG. 4, when the layers 25 and 26 are brought together, the portion of layer 25 that has been drawn into recess 19 will not be in contact with layer 26. In this position and at this point in the operation the layers 25 and 26 are heat sealed around the periphery of recess 19. To perform the heat sealing operation we have provided an R.F. generator 28, capable of generating frequencies ranging from 10 mc./sec. to about 100 mc./sec., which supplies power to electrodes 16 and 17 via leads 29 and 30 respectively. When the layer are in the contact position, the R.F. power is switched on for a preset period of time, generally about 1–10 seconds depending on the characteristics of the flexible material, and the layers are dielectrically sealed. Insulation 31 is provided between the upper plate electrode and the machine to prevent electrical contact therewith.

After sealing, the ram 15 is lowered and the vacuum pump is shut off and vacuum line 24 is opened to the atmosphere through line 24a which allows air to reenter recess 19, to thereby release the sealed layers. Any excess material from around the hand portion is then trimmed and the hand covering is inverted to present the inner surface outwardly.

The finished hand coverings of this invention have a fullness imparted to the back which gives rise to their three-dimensional characteristics without undue stretching or deleterious effects to the material. Furthermore, as illustrated in FIG. 1, the marginal edges of the back portion 33 and the palm portion 32 are dielectrically sealed in the area 34 transversely displaced from the central plane 35 between the portions. The seams therefore, in the thumb and finger crotches of gloves is moved away from the point of maximum stress which has been found to occur in the crotches.

A more detailed disclosure of the preferred materials which may be utilized in this glove making method and device, and test data which indicate the strength of the dielectrically sealed seam of one of the materials (polyvinyl chloride coated fabrics) may be found in our co-pending application Serial No. 76,575, filed December 19, 1960.

Although certain specific embodiments of the invention have been particularly shown and described, it will be understood that the invention is capable of further modifications and no limitations are intended other than those imposed by the claims hereinafter set forth.

Having thus described our invention, what we claim and desire to protect by Letters Patent is:

1. The method of making a three-dimensional hand covering comprising the steps of placing a first sheet of flexible thermoplastic material over a die which contains a recessed portion having the contour of a human hand, evacuating air from said recessed portion to draw a portion of said first sheet into said recessed portion to thereby impart said contour to said portion of said first sheet, positioning a second sheet of said material in contact with said first sheet, and dielectrically heat sealing the sheets together along the periphery of said recessed portion.

2. The method of claim 1, wherein said second sheet is positioned in contact with said first sheet in substantially a single plane.

References Cited in the file of this patent

UNITED STATES PATENTS

| | | |
|---|---|---|
| 2,577,284 | Steinle | Dec. 4, 1951 |
| 2,737,662 | Winson | Mar. 13, 1956 |